3,015,573
TITANIUM DIOXIDE PIGMENT CARRYING AN AMINE SALT AS DISPERSION AID
Myron L. Myers and Walter R. Whately, Lynchburg, Va., assignors to American Cyanamid Company, New York, N.Y., a corporation of Maine
No Drawing. Filed Apr. 14, 1959, Ser. No. 806,211
6 Claims. (Cl. 106—300)

The present invention relates to dry titanium dioxide pigment of improved dispersibility in surface-coating composition vehicles after compaction and storage. The invention particularly relates to such pigment having the improved properties mentioned as the result of the presence thereon in molecularly adsorbed form of an organic tertiary amine salt.

Titanium dioxide is at present the premier white pigment of commerce. Practically all of this pigment is produced in centrally located plants and is delivered to customers in dry powder form. Generally the pigment is packaged in 50-lb. multi-wall paper bags which are shipped by truck or rail. The bags are warehoused before and after shipment for periods of time required by circumstances. Generally at least several weeks elapse between manufacture of the pigment and its utilization by the customer, so that prior to use the pigment is subjected to protracted warehousing. During warehousing and shipment the bags are stacked upon each other, so that the pigment is stored under substantial pressure.

The size of titanium dioxide pigment particles is maintained within a narrow range to ensure best optical and physical properties, and it has long been known that the particles have high free surface energy which causes them to clump together when packaged and stored. Dispersion of such pigment to optimum extent in surface-coating vehicles consequently requires expenditure of a substantial amount of off-setting energy, and in the past the addition of a suitable dispersing agent to the vehicle has been considered a practical necessity for the purpose. The vehicles referred to include linseed oil and other drying and non-drying oils, alkyd resins, alkylated amine-aldehyde resins, and water in the case of latex paints.

The discovery has now been made that dry titanium dioxide pigment particles having adsorbed thereon a small amount of the water-soluble salt of a tertiary amine with an organic acid of low water solubility is substantially improved as regards its dispersibility in surface-coating composition vehicles. In preferred embodiments the pigment forms as few as 20% of the oversize aggregates which it would otherwise form. The pigment possesses the following additional advantages:

(1) The pigment disperses substantially more easily in any given vehicle. The pigment thus permits any given surface coating to be prepared more rapidly, or with less power.

(2) The pigment exhibits greater tendency to dry flow. It is thus more easily emptied from the bags in which it is shipped.

(3) The pigment is substantially unaffected as regards its other principal physical properties. Oil absorption, color, gloss, opacity, specific electrical resistance and chalk resistance values are substantially those of corresponding pigment without the amine salt.

(4) The pigment is stable. The amine salt is non-volatile, so that the dispersibility characteristics of the pigment are long-lasting.

The amount of the amine salt treating agent carried by pigment of the present invention is small. The minimum effective amount has not yet been determined, but the evidence is that this minimum is about 0.01% of the dry weight of the pigment. At the other extreme, pigment carrying more than about 3% by weight of the agent possesses closely similar properties to the properties possessed by pigment carrying somewhat less agent, so that the value of 3% is taken as the upper practical limit. Calculations indicate that this amount of treating agent is about sufficient to form a monomolecular layer over at least the exposed surface of the pigment particles. In practice we find that the maximum improvement per increment of agent occurs within the range of about 0.1% to 1%, and this range is accordingly preferred.

Laboratory trials have shown that very satisfactory improvement in dispersibility occurs when the pigment particles carry between about 0.1% and 0.3% by weight of the treating agent. The reason why such very small amount (less than that needed to form a monomolecular layer) of treating agent produces such remarkable improvement is not known, and we do not wish to be bound by any theory.

The titanium dioxide pigment benefited by the present invention includes the grades which contain small amounts of alkali metal and alkali earth metal salts as conditioning agents; the salts of other metals such as antimony and zinc as brighteners and rutile convertors; and the hydrous oxides of aluminum, titanium, zirconium, silicon and similar elements as agents improving the color and chalk resistant values of the pigment. The amount of these salts and agents is usually less than 5% of the weight of the pigment. The invention is further usefully applied to titanium dioxide pigment containing extender material such as calcium sulfate, barium sulfate, lithopone, etc.

Pigment according to the present invention can be prepared according to a number of procedures. One convenient method is to meter the tertiary amine salt and the pigment into a fluid energy mill such as that disclosed in U.S. patent No. 2,219,011 granted on October 22, 1940, to Kidwell et al. (wherein pigment particles are introduced as a jet into a stream of superheated steam moving at supersonic velocity, and are thus made to collide together with great force). With care it is possible to meter the small amount of treating agent uniformly into the stream of pigment as it enters the mill; the frequent violent collisions spread the agent over the surface of the particles.

In practice, we have found it more convenient to supply the amine salt by the use of a solvent medium. According to this method the salt is dissolved in a suitable solvent and the solution added to a slurry of titanium dioxide pigment. The slurry is then agitated until the treating agent is uniformly distributed, after which it may be dried, upon which the salt is molecularly adsorbed on the surface of the particles. The solvent may be an organic liquid, but water is preferred as the solvent medium. The pigment may be in flocculated or deflocculated form during treatment.

Commercially, we find it most convenient to add the amine salt to the slurry resulting from the hydroclassification step to which pigment is subjected to remove oversize (+4 micron) particles. The slurry is dewatered and dried, and the pigment passed through a fluid energy mill as described.

Where the latter method is employed, the weight of amine salt in the solution should be a predetermined excess over the amount desired to be deposited on the pigment. Typically 20%–40% of the salt remains in the aqueous or solvent phase or is lost during dewatering, and the optimum amount to be added in any one instance is most easily found by trial by use of the laboratory method shown in the examples.

The amine salts suitable for use as treating agents in the present invention are soluble in water at least to the extent of 1%, and are the salts of water-soluble tertiary amines with organic acids which are difficultly soluble in water. The acid components of these salts have solubilities within the range of about 1/20 to 2% by weight in water at 20° C. Acids in this group include 2,4-hexadienoic acid, octadecylsulfonic acid, cinnamic acid, adipic acid, and the diester of phosphoric acid with two mols of 2-ethyl-1-pentanol. The range of solubilities is critical, as pigment carrying tertiary amine salts of organic acids having solubilities on either side of the range are not easily dispersible in both organic and aqueous media. The tertiary amine component should be sufficiently soluble that its salt with the acid is soluble at least to the extent of 1% as aforesaid. Suitable amines include triethylamine, N-methyl morpholine, pyridine, 2-methylpyridine, and 4-picoline. Titanium dioxide pigment carrying mixtures of the aforesaid amine salts is within the scope of the invention.

The salts may be prepared by mixing the amines and the acid in substantially stoichiometrical proportions in water.

The invention will be further described by the examples which follow. These examples represent specific embodiments of the invention and are not to be construed as limitations thereon.

*Examples 1–5*

The following illustrates the improved dispersibility in organic and aqueous media of a number of examples of titanium dioxide pigment according to the present invention. The pigments are prepared by hydroclassifying titanium dioxide pigment to remove any oversize (>4μ) particles, washing the pigment on a suction filter with distilled water at 70° C. to remove soluble salts, reslurrying the pigment in water to 30% solids at pH 7.2 and at 50° C., adding a suitable tertiary amine salt, stirring for two hours at 70° C. and dewatering. The cake is dried at 115° C., and the pigment milled in a fluid energy mill operating on steam at 480° F. and 105 lb./in.² pressure. If desired, one or more salts such as aluminum sulfate, titanium sulfate, or sodium silicate may be added to the initial pigment slurry and hydrolyzed to deposit white hydrous oxidic material on the pigment (cf. Example 1 of Whately U.S. Patent No. 2,671,031, granted March 2, 1954).

The dispersibility of the resulting pigment in hydrophobic organic vehicles is determined according to a standard laboratory test wherein the pigment is formulated into an alkyd resin paint, the paint drawn down on glass slides with a 0.002″–0.000″ Bird applicator, the resulting wedge-shaped film is dried, and a count is made of the number of aggregates seen on the thick half of the film wedge when a bright light is reflected from the slide at an angle of about 30°. Results are stated on the following scale:

| Rating | | Number of Visible Aggregates/cm.² |
|---|---|---|
| A | Very good | 0 to 25 |
| B | Good | 25 to 50 |
| C | Fair | 50 to 80 |
| D | Poor | >80 |

The dispersibility of the resulting pigment samples in aqueous media was determined by intensively mixing 250 gm. of the pigment and 182 ml. of a 0.1% aqueous solution of tetrasodium pyrophosphate for four minutes using a laboratory "Lightnin'" mixer, pouring the resulting slurry upon a 60-mesh screen, washing the slurry fines through the screen by means of a light spray of water, removing the screen oversize fraction, weighing the oversize fraction after drying, and reporting the weight of the oversize fraction as a percentage of the pigment screened. Experience has shown that this test is a practical index of the dispersibility of the pigment in organic paint, lacquer and enamel vehicles as well.

Results are as follows, shown in comparison with the results obtained with pigment prepared in the same manner without addition of tertiary amine salt.

| Run No. | Pigment | | | | Tert. Amine Salt Added | | Dispersibility Ratings | |
|---|---|---|---|---|---|---|---|---|
| | Structure | Hydrous Oxides Present | | | Name | Percent [4] | Oil [5] | H₂O [5] |
| | | Ti [1] | Si [2] | Al [3] | | | | |
| 1A | Anatase | None | None | None | None (control) | None | D | 9.8 |
| 1B | do | None | None | None | Triethanolamine 2-ethylhexanoate | 1.0 | B-C | 1.2 |
| 2A | Rutile | None | None | 1.0 | None (control) | None | C-D | 4.1 |
| 2B | do | None | None | 1.0 | Triethanolamine 2-ethylhexanoate | 0.6 | B | 0.5 |
| 3A | do | 1.0 | 1.0 | 2.0 | None (control) | None | B | 1.0 |
| 3B | do | 1.0 | 1.0 | 2.0 | Triethanolamine 2-ethylhexanoate | 0.6 | A-B | 0.3 |
| 4A | do | None | None | 2.0 | None (control) | None | C | 1.5 |
| 4B | do | None | None | 2.0 | Triethanolamine benzoate | 1.0 | B | 0.5 |
| 5A | do | None | None | 1.0 | None (control) | None | D | 3.8 |
| 5B | do | None | None | 1.0 | Tribenzylamine 2-ethylhexanoate | 1.0 | B | 0.4 |

[1] Calculated as TiO₂.
[2] Calculated as SiO₂.
[3] Calculated as Al₂O₃.
[4] Based on dry weight of pigment.
[5] See text above.

We claim:
1. Dry titanium dioxide pigment particles having adsorbed thereon a small but effective amount of a water-soluble salt of a water-soluble tertiary amine with an organic acid having a solubility between 1/20% and 2% by weight in water at 20° C. as agent improving the dispersibility of said particles in water and in hydrophobic alkyd resins.
2. Pigment particles according to claim 1 wherein the organic acid is an organic carboxylic acid.
3. Pigment particles according to claim 1 wherein the salt is tribenzylamine 2-ethylhexanoate.
4. Pigment according to claim 1 wherein the salt is triethanolamine 2-ethylhexanoate.
5. Pigment according to claim 1 wherein the salt is triethanolamine benzoate.
6. Pigment according to claim 1 wherein the amount of adsorbed salt is less than that needed to form a monomolecular layer thereon.

(References on following page)

References Cited in the file of this patent

UNITED STATES PATENTS

| | | |
|---|---|---|
| 2,160,119 | Brodersen | May 30, 1939 |
| 2,305,379 | Detrick et al. | Dec. 15, 1942 |
| 2,457,591 | Moore | Dec. 28, 1948 |
| 2,819,174 | Vartanian | Jan. 7, 1958 |
| 2,852,406 | Riegler et al. | Sept. 16, 1958 |

FOREIGN PATENTS

| | | |
|---|---|---|
| 780,799 | France | May 3, 1935 |

OTHER REFERENCES

Fischer et al.: Industrial and Engineering Chemistry, vol. 35, No. 3, March 1943, pages 336–342.